Patented Jan. 10, 1928.

1,655,690

UNITED STATES PATENT OFFICE.

SAMUEL J. DUNKLEY, DECEASED, LATE OF OAKLAND, CALIFORNIA, BY JENNIE M. DUNKLEY, ADMINISTRATRIX, OF OAKLAND, CALIFORNIA, ASSIGNOR, BY MESNE ASSIGNMENTS, TO SPRAGUE SELLS CORPORATION, OF CHICAGO, ILLINOIS, A CORPORATION OF DELAWARE.

PROCESS OF PEELING FRUITS AND VEGETABLES.

No Drawing.    Application filed November 7, 1925. Serial No. 67,669.

This invention relates to improved process of peeling fruit and vegetables, particularly such as have a resistant, hard, firm or tough skin, such as apples, quinces, potatoes, pumpkins, squash, or the like.

The object of the invention is to provide improved process and means for hastening and assisting the action of caustic or skin softening means in softening and disintegrating the skin of the fruit or vegetable so that it may be readily washed away by spraying or other means and effective peeling be thereby accomplished.

Objects which pertain to details will definitely appear from the detailed description to follow.

The objects of the invention are accomplished by the means and methods described in the following specification. The invention is fully defined and pointed out in the claims.

The improved method consists first in a preliminary warming and moistening of the peel, which is preferably accomplished by light steaming which dampens and heats the surface so that it will the more readily absorb and retain a film of caustic solution, next to be applied.

The next step is to apply a solution of concentrated hot caustic soda to the preliminarily prepared surface. This is done best by subjecting the surface to the action of a misty spray of very hot caustic soda in a confined space so that a minimum of soda will be evenly distributed over the entire surface to be peeled.

The third step is to subject the fruit while thus moist with the caustic solution to strong heat of above 400 degrees Fahr. up to white heat, depending upon the resistance of the particular peel being removed. This application of heat has the effect of concentrating the caustic soda solution by quickly evaporating the moisture therefrom. This leaves a very thin deposit of hot caustic on the surface of the peel which reacts very strongly in disintegrating the same. The heat also acts upon the organic constituents of the peel, causing some of them to evaporate and some to ignite and burn, or both, thus breaking up, loosening and reducing the skin of the fruit or vegetable to cinder or ash, so that it yields readily to the further steps of the process.

This heating is best done in a gas or oil furnace, exposing the peel on the fruit to the direct heat of the combustion. Electric furnaces are also available. It is best to pass the specimens of fruit or vegetable quickly through by suitable conveyor means.

Then, the surface is again subjected to the treatment of hot caustic soda solution. This is preferably applied as a spray or mist. It completely softens the disintegrated peel and softens the texture of any cinder so that it becomes flexible and is not harsh and likely to be forced into the pulp. The disintegrated and softened peel is then washed away, preferably by active sprays upon the entire surface to remove the peel and any remaining caustic.

The complete process is only necessary with fruit or vegetables having very resistant skins. It is necessary on some apples which have been affected with blight, or that are not fully ripe or that have been kept in cold storage. It is necessary or desirable in the treatment of Irish potatoes, where a very thorough treatment from start to finish is desirable.

The first step, of course, that is, the preliminary moistening and heating, could be dispensed with in all instances by taking greater care with the next succeeding step. In certain instances, as with tomatoes and pears, the first treatment to caustic can often be omitted. Where the caustic is applied very thoroughly in the first instance and then followed by heat treatment, the second caustic treatment may in many instances be omitted, although that is desirable in nearly every instance, modifying the strength of the solution to suit different conditions. A weak solution would be invariably desirable, a weak solution often being sufficient, and in some instances a very strong solution should be used.

Having thus described the invention, what is claimed as new and desired to secure by Letters Patent is:

1. The process of peeling fruit and vegetables consisting of a preliminary heating of the surface with steam and hot water, subjecting the preheated surface to the action of hot caustic soda solution, subjecting the surface and applied caustic solution to strong heat to concentrate the solution and incinerate or destroy the organic substance of the peel and disintegrate the same, subjecting the heat treated surface to the action of hot caustic soda solution, and washing away the disintegrated peel by sprays applied to the entire surface, as specified.

2. The process of peeling fruit and vegetables consisting of subjecting the surface to the action of hot caustic soda solution, subjecting the surface and the applied caustic solution to strong heat to concentrate the solution and incinerate or destroy the organic substance of the peel and disintegrate the same, subjecting the heat treated surface to the action of hot caustic soda solution, and washing away the disintegrated peel by sprays applied to the entire surface, as specified.

3. The process of peeling fruit and vegetables consisting of subjecting the surface to strong heat to incinerate or destroy the organic substance of the peel and disintegrate the same, subjecting the heat treated surface to the action of hot caustic soda solution, and washing away the disintegrated peel by sprays applied to the entire surface, as specified.

4. The process of peeling fruit and vegetables consisting of subjecting the surface to the action of hot caustic soda solution, subjecting the surface and the applied caustic solution to strong heat to concentrate the solution and incinerate or destroy the organic substance of the peel and disintegrate the same, subjecting the heat treated surface to the action of hot caustic soda solution, and washing away the disintegrated peel, as specified.

5. The process of peeling fruit and vegetables consisting of subjecting the surface to the action of hot caustic soda solution, subjecting the surface and the applied caustic solution to strong heat to concentrate the solution and incinerate or destroy the organic substance of the peel and disintegrate the same, and washing away the disintegrated peel, as specified.

6. The process of peeling fruits and vegetables consisting of subjecting the surface to the action of a skin softening solution, subjecting the surface with the applied solution to strong heat to concentrate the solution and incinerate or destroy the organic substance of the peel and disintegrate the same, subjecting the heat treated surface and disintegrated peel to the further action of the skin softening solution, and then washing away the disintegrated peel.

7. The process of peeling fruit and vegetables consisting of subjecting the surface to strong heat to incinerate or destroy the organic substance of the peel and disintegrate the same, subjecting the heat treated surface and disintegrated peel to the action of a skin softening solution, and then washing away the disintegrated peel.

8. The process of peeling fruit and vegetables consisting of subjecting the surface to the action of a skin softening solution, subjecting the surface with the applied solution to strong heat to concentrate the solution and incinerate or destroy the organic substance of the peel and disintegrate the same, and then washing away the disintegrated peel.

9. The process of peeling fruit and vegetables consisting of subjecting the fruit to strong heat to incinerate or destroy the organic substance of the peel and disintegrate the same, subjecting the heat treated surface to the action of hot caustic soda solution, and washing away the disintegrated peel, as specified.

In witness whereof I have hereunto set my hand.

JENNIE M. DUNKLEY,
*Administratrix of Samuel J. Dunkley, Deceased.*